United States Patent
Achhammer et al.

(10) Patent No.: US 9,490,509 B2
(45) Date of Patent: Nov. 8, 2016

(54) MOTOR VEHICLE WITH BATTERY COOLING SYSTEM

(71) Applicant: Audi AG, Ingolstadt (DE)

(72) Inventors: Siegfried Achhammer, Regensburg (DE); Armin Pöppel, Gaimersheim (DE); Uwe Gerlinger, Kipfenberg (DE)

(73) Assignee: AUGI AG, Ingolstadt (DE)

( * ) Notice: Subject to any disclaimer, the term of this patent is extended or adjusted under 35 U.S.C. 154(b) by 0 days.

(21) Appl. No.: 14/423,004

(22) PCT Filed: Aug. 13, 2013

(86) PCT No.: PCT/EP2013/002420
§ 371 (c)(1),
(2) Date: Feb. 20, 2015

(87) PCT Pub. No.: WO2014/029474
PCT Pub. Date: Feb. 27, 2014

(65) Prior Publication Data
US 2015/0214587 A1  Jul. 30, 2015

(30) Foreign Application Priority Data
Aug. 23, 2012  (DE) .................. 10 2012 016 801

(51) Int. Cl.
*H01M 10/02* (2006.01)
*H01M 10/6564* (2014.01)
(Continued)

(52) U.S. Cl.
CPC ............ *H01M 10/6564* (2015.04); *B60K 6/28* (2013.01); *B60L 3/0046* (2013.01); *B60L 11/14* (2013.01); *B60L 11/1874* (2013.01);
(Continued)

(58) Field of Classification Search
CPC .......... H01M 10/6564; B60L 11/1874; Y10S 903/907
USPC ......................................... 429/61; 180/65.29
See application file for complete search history.

(56) References Cited

U.S. PATENT DOCUMENTS 5,567,540 A * 10/1996 Stone ...................... H01M 2/18
429/403
6,422,027 B1   7/2002 Coates, Jr. et al.
(Continued)

FOREIGN PATENT DOCUMENTS

CN          201336342       10/2009
CN          102 386 460 A    3/2012
(Continued)

OTHER PUBLICATIONS

International Search Report issued by the European Patent Office in International Application PCT/EP2013/002420.
(Continued)

*Primary Examiner* — Emily Le
*Assistant Examiner* — Monique Wills
(74) *Attorney, Agent, or Firm* — Henry M. Feiereisen LLC.

(57) ABSTRACT

A motor vehicle includes at least one battery module configured to be cooled by compressed gas. The battery module has a cooling system which has an accumulator for compressed gas that can be fed to the battery module for cooling. A control device controls supply of gas from the accumulator to the battery module in dependency of at least one output value from at least one sensor configured to measure a current output from the battery module.

9 Claims, 2 Drawing Sheets

(51) Int. Cl.
*B60L 11/18* (2006.01)
*B60L 3/00* (2006.01)
*B60L 11/14* (2006.01)
*H01M 10/625* (2014.01)
*H01M 10/613* (2014.01)
*B60K 6/28* (2007.10)
*H01M 10/48* (2006.01)

(52) U.S. Cl.
CPC ......... *H01M 10/48* (2013.01); *H01M 10/613* (2015.04); *H01M 10/625* (2015.04); *B60L 2240/12* (2013.01); *B60L 2240/662* (2013.01); *H01M 10/486* (2013.01); *H01M 2220/20* (2013.01); *Y02T 10/70* (2013.01); *Y02T 10/705* (2013.01); *Y02T 10/7005* (2013.01); *Y02T 10/7077* (2013.01); *Y02T 10/7291* (2013.01); *Y02T 90/16* (2013.01); *Y10S 903/907* (2013.01)

(56) References Cited

U.S. PATENT DOCUMENTS

| | | |
|---|---|---|
| 2004/0065491 A1 | 4/2004 | Dudley et al. |
| 2009/0320715 A1 | 12/2009 | Morita et al. |
| 2011/0045326 A1 | 2/2011 | Leuthner et al. |
| 2011/0206948 A1* | 8/2011 | Asai .................. H01M 2/0473 429/7 |
| 2011/0256431 A1 | 10/2011 | TenHouten et al. |
| 2013/0179012 A1* | 7/2013 | Hermann ............. B60L 3/0046 701/22 |
| 2013/0337294 A1 | 12/2013 | Achhammer |
| 2014/0057547 A1* | 2/2014 | Kang .................... F24F 11/053 454/258 |

FOREIGN PATENT DOCUMENTS

| | | |
|---|---|---|
| CN | 102555732 | 7/2012 |
| DE | 102 18 539 A1 | 11/2002 |
| DE | 103 37 493 A1 | 4/2004 |
| DE | 10 2008 011 466 A1 | 9/2009 |
| EP | 2 216 843 A1 | 8/2010 |
| EP | 2 216 849 A1 | 8/2010 |
| JP | 2000 350 411 A | 12/2000 |
| JP | 2011 076 926 A | 4/2011 |
| WO | WO 2010/116106 | 10/2010 |
| WO | WO 2011/107196 | 9/2011 |

OTHER PUBLICATIONS

Chinese Search Report issued in corresponding Chinese Patent Application No. 2013800335009 on Mar. 23, 2016.
English translation of Chinese Search Report issued in corresponding Chinese Patent Application No. 2013800335009 on Mar. 23, 2016.

* cited by examiner

MOTOR VEHICLE WITH BATTERY COOLING SYSTEM

CROSS-REFERENCES TO RELATED APPLICATIONS

This application is the U.S. National Stage of International Application No. PCT/EP20131002420, filed Aug. 13, 2013, which designated the United States and has been published as International Publication No. WO 2014/029474 and which claims the priority of German Patent Application, Serial No. 10 2012 016 801.2, filed Aug. 23, 2012, pursuant to 35 U.S.C. 119(a)-(d).

BACKGROUND OF THE INVENTION

The invention relates to a motor vehicle with at least a battery module having a cooling system.

Electric mobility is becoming increasingly important in particular from an environmental point. While purely electric vehicles still play a minor role and are particularly suitable for transport in inner cities, hybrid vehicles, especially mild-hybrid vehicles, become increasingly common.

In typical hybrid vehicles, a combustion engine and an electric motor are used. The electric propulsion portion is merely supportive in a mild-hybrid, i.e. it is used to improve the performance of the vehicle. In addition, fuel can be saved especially when starting or accelerating. The batteries are here charged mainly by recovered energy, for example by braking.

Especially in a mild-hybrid, batteries can be charged or discharged very quickly. Because each battery has an internal resistance, this causes heating of the battery. However, high temperatures may reduce the lifetime of the batteries. In addition, it may be necessary to limit the charging and discharging rate in order to avoid overheating of the battery. Therefore, such a battery module is advantageously cooled.

The document DE 103 37 493 A1 discloses a method and an apparatus for cooling a vehicle battery. The battery is placed in a container which is substantially sealed except for a cooling air inlet and an air discharge opening. An air nozzle is provided which deflects the relatively cool air from the outside of the vehicle to the cooling air inlet. Air then flows past the battery, cooling the battery. However, only a limited cooling performance can be achieved with cooling based solely on ambient air.

DE 10 2008 01 1466 A1 discloses a battery module, which is cooled by a compressed refrigerant fluid, specifically air. The use of compressed air provides two advantages. On the one hand, this air has more mass per unit volume, which increases the cooling capacity. On the other hand, the battery module may include an expansion element, providing cooling through expansion. However, the air is heated by the compression, which adversely reduces the cooling performance. This is avoided in that the compressed air is cooled between the compressor and the battery module. A chiller is proposed for cooling. However, such a cooling arrangement consumes a substantial amount of energy.

SUMMARY OF THE INVENTION

It is therefore an object of the invention to provide a motor vehicle with a comparatively more efficient cooling system for a battery module.

This object of the invention for a motor vehicle of the aforementioned type is attained by providing the cooling system with a pressure accumulator for compressed gas which can be supplied to the battery module for cooling.

The invention is based on the idea to cool the battery module with gas from a pressure accumulator. The pressure accumulator is filled by a compressor, whereby the gas in the pressure accumulator is first heated; however, with a sufficient size of the pressure accumulator, the gas is thermalized before being used as a refrigerant, i.e. adapted to the ambient temperature. Due to the longer time interval between compression of the gas and its use as cooling gas, the gas can be cooled purely passively, thus avoiding additional energy consumption. As already described, it is advantageous to use gas at a higher pressure for cooling, which increases the density of the gas and allows more energy to be transported and improves the cooling performance. However, it may also be advantageous to expand the gas between the pressure accumulator and the battery module or on the battery module, which lowers the temperature of the gas.

It is possible to use cooling gases that are already liquid at moderate pressures. This has the advantage that the evaporation heat can be dissipated in addition to the normal cooling performance of the gas. Most cooling gases that are already liquid at low pressures, however, are not present in the environment and often toxic or flammable. A closed cooling circuit is therefore necessary.

Alternatively, however, ambient air can be used, which may be received, for example, through an air nozzle in the front region of the vehicle, thereby already attaining pre-compression particularly at high driving speeds.

Particularly when cooling with compressed ambient air, the battery module may be cooled from the outside, i.e. by blowing a compressed gas against it. This type of cooling is particularly easy to implement. However, the hottest parts of the battery module may then disadvantageously not be directly cooled. It is therefore advantageous to construct a battery module so that a gas stream can be routed along hot parts.

It is particularly advantageous to arrange a pressure-relief device, in particular a throttle, between the pressure accumulator and the battery module. The gas thereby expands. This is typically done polytropically. The temperature change can thus be described by the formula $$T_2 = T_1 * \frac{p_2^{\frac{n-1}{n}}}{p_1^{\frac{n-1}{n}}}$$

Here, $T_2$ is the temperature after the expansion, $T_1$ is the temperature before the expansion, $p_2$ is the pressure after the expansion, $p_1$ is the pressure before the expansion, and n is a constant which is typically 1.3 when air is the medium. The temperatures are indicated in Kelvin.

With this type of expansion, a gas stream with a temperature far below 0° C. can be readily produced. The throttle can be implemented either as a fixed throttle, or as a controllable throttle valve.

Especially in terms of easier maintenance of the motor vehicle, it is advantageous when the gas is air, thus making a closed cooling system unnecessary. The air is received by an intake nozzle and discharged directly into the ambient air after cooling. Such cooling with air places a much lower demand on the tightness of the system. For example, if a closed cooling circuit with coolant was to be used, then even the smallest leaks in the cooling circuit would require that the coolant be regularly be replenished. Another advantage of cooling with ambient air is that the air, which is warmed considerably after cooling the battery module, can be discharged directly into the environment, and thus does not need to be cooled again.

The invention may be realized in a particularly simple manner if the vehicle already includes an air suspension or an air brake system based on compressed air. The pressure accumulator, which is part of a vehicle-side air spring or the brake system, can then also serve as a pressure accumulator for the cooling apparatus of the battery module. Only a few additional components are then required for cooling the battery module with compressed air. No additional compressor or pressure accumulator is necessary, but instead only additional lines, a throttle and a valve.

Advantageously, in the motor vehicle according to the invention, a passive cooling element which preferably has cooling fins may be arranged on a supply line of the gas to the pressure accumulator and/or on the pressure accumulator itself. When used for cooling, it is very important that the gas is not hot. When large quantities of cooling gas are consumed, compression can cause the gas to heat up. Passive cooling of the tank or supply lines can help. Such a purely passive cooling is easier to maintain, cheaper and easier to integrate in the motor vehicle, than active cooling, for example when using a chiller. The cooling capacity of the passive cooling can be further improved by routing an existing cooling air flow, for example for cooling components of the engine, also past this passive cooling element.

As described above, the cooling capacity for the battery module is significantly improved by cooling with compressed air. However, a high cooling capacity is not necessary in many driving situations. Cooling the battery module with ambient air is more energy-efficient than cooling with compressed air. Therefore, it is advantageous if the motor vehicle includes at least one air supply device configured to supply air from the surroundings of the vehicle to the battery module. In driving situations where no intense cooling is necessary, the battery can then be cooled with an air nozzle as an air supply device and thus by the air flow.

It is also advantageous if in the vehicle according to the invention the battery is cooled by a controlled supply of compressed air. Therefore, the motor vehicle may include a controller which is configured to control the supply of gas from the pressure accumulator to the battery module as a function of at least one output value from at least one sensor. Sufficient cooling of the battery module can then be ensured in all driving situations, while at the same time minimizing the energy expenditure required to compress the gas. The sensor may be a temperature sensor disposed on the battery module, which enables a simple control. For example, the cooling may be activated when the temperature of the battery exceeds a fixed value. On the other hand, the supply of compressed air may also be continuously controllable. The control device can then optimally dose the supplied quantity of compressed depending on the temperature.

The sensor may also be designed to measure the current output of the battery module. When the battery supplies more current, increased heating results. A direct measurement of the current has the advantage that an increase of the battery temperature must not subsequently be reversed by supplying more compressed air, but that instead an increase in temperature of the battery is avoided. This can further improve the battery life. Of course, several sensors may also be combined. For example, a temperature sensor can ensure that the temperature reliably does not exceed or drop below certain limit temperatures, while a current sensor may prevent large fluctuations in temperature.

The vehicle of the invention may be a hybrid vehicle that includes both a combustion engine and an electric motor. Especially in hybrid vehicles, the batteries are frequently charged and discharged. Cooling of the battery is therefore especially important.

BRIEF DESCRIPTION OF THE DRAWING

Further advantages and details of the present invention will become apparent from the exemplary embodiment described below and from the drawings, which show in.

DETAILED DESCRIPTION OF PREFERRED EMBODIMENTS

Figure 1:
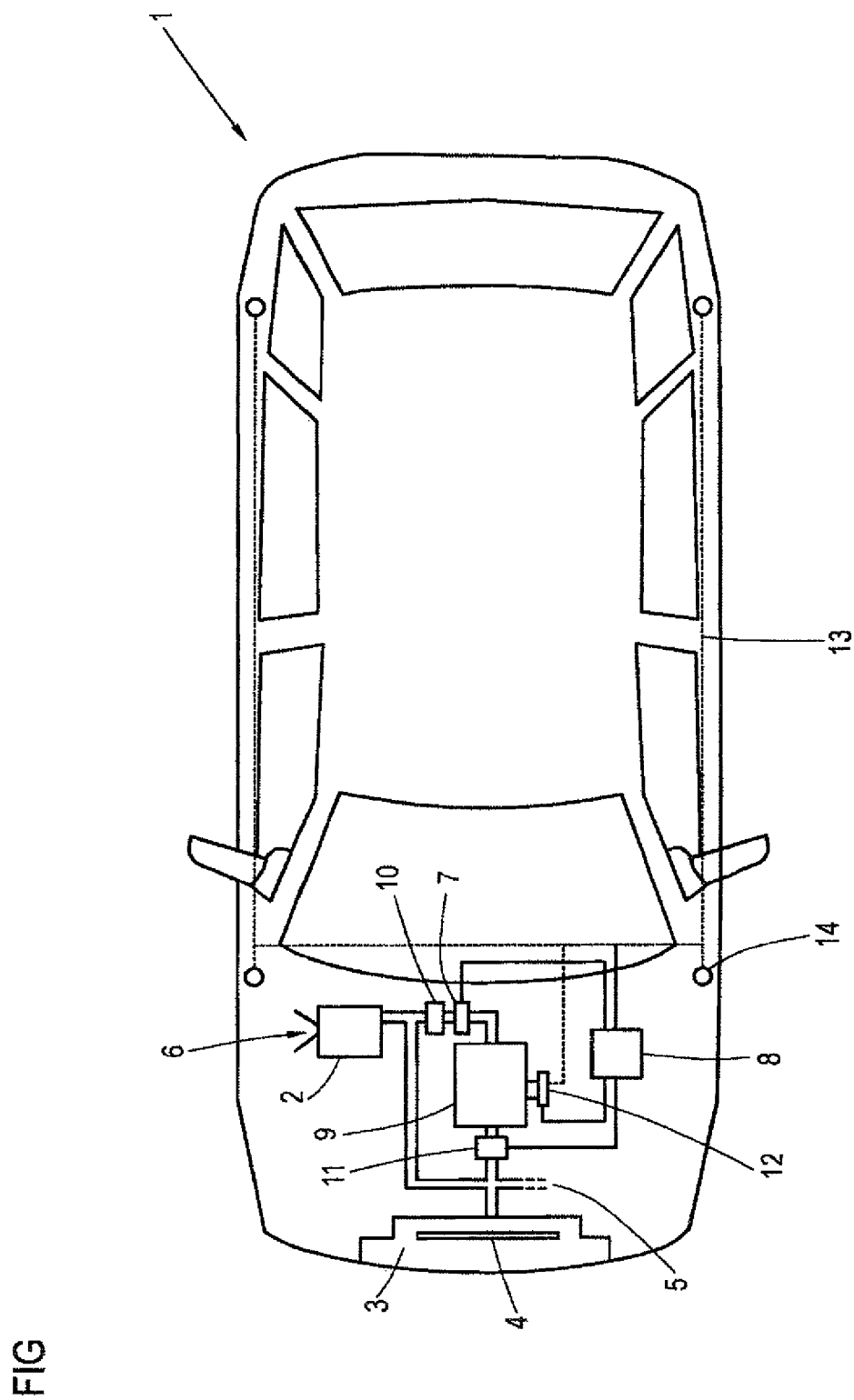
FIG. 1 an exemplary embodiment of a motor vehicle according to the invention, and FIG. 2 a pneumatic diagram of an air suspension system, which is expanded with a battery cooling system, of the motor vehicle according to the invention.

FIG. 1 shows an exemplary embodiment of a motor vehicle 1 having a cooling system for a battery module 2. The battery module 2 can be cooled with compressed air, in addition to cooling by a conventional ventilation system 3 with a fan 4. In this case, the valve 7 is opened by the control device 8 and compressed air is supplied to the battery module 2 from the pressure accumulator 9. A throttle 10 which limits the flow of gas is also provided between the pressure accumulator 9 and the battery module 2. The gas is thereafter expanded and thus cooled in the subsequent pipe. The gas is supplied to the battery module 2 with overpressure, flows through the battery module 2 and is discharged at the exhaust outlet 6 back into the environment. The pressure accumulator 9 is part of the air suspension system and is connected to the pneumatic circuit 13 of the air suspension system by way of a valve 12. The pneumatic circuit 13 of the air suspension system can supply compressed air specifically to the air springs 14, or release compressed air from the compressed springs. The control is also performed by the control device 8. The control device 8 can activate a compressor 11 to pump gas from the ventilation system 3 into the pressure accumulator 11.

In addition, a short estimate of the cooling capacity attainable with such a system will be presented. A polytropic change of state occurs at the throttle 10. The outlet temperature $T_2$ can be calculated with the formula $$T_2 = T_1 * \frac{p_2^{\frac{n-1}{n}}}{p_1^{\frac{n-1}{n}}}$$

from the inlet temperature $T_1$ and the inlet pressure $p_1$, and the outlet pressure $p_2$, wherein n is typically 1.3 when air is the medium.

If a pressure of 5 bar (=0.5 N/mm$^2$) is assumed in the high pressure part of the system and 1 bar for the ambient pressure, and if it is also assumed that the compressed air from the compressed air tank is warm with a temperature of 50° C., then an output temperature of −50° C. can be calculated, with the consideration that all temperatures in the formula are in Kelvin. If one liter of air per second is now being used to cool the battery, then the dissipated heat can be calculated as a product of the mass of refrigerant and the heat capacity of the coolant and the temperature difference. The temperature difference then corresponds to 90° C. with a temperature of the battery of approximately 40°. A heat dissipation of 111.2 watts can thus be calculated. Since the air suspension systems of vehicles typically operate with system pressures of about 8 bar, the abovementioned cooling efficiency can easily be exceeded.

Figure 2:
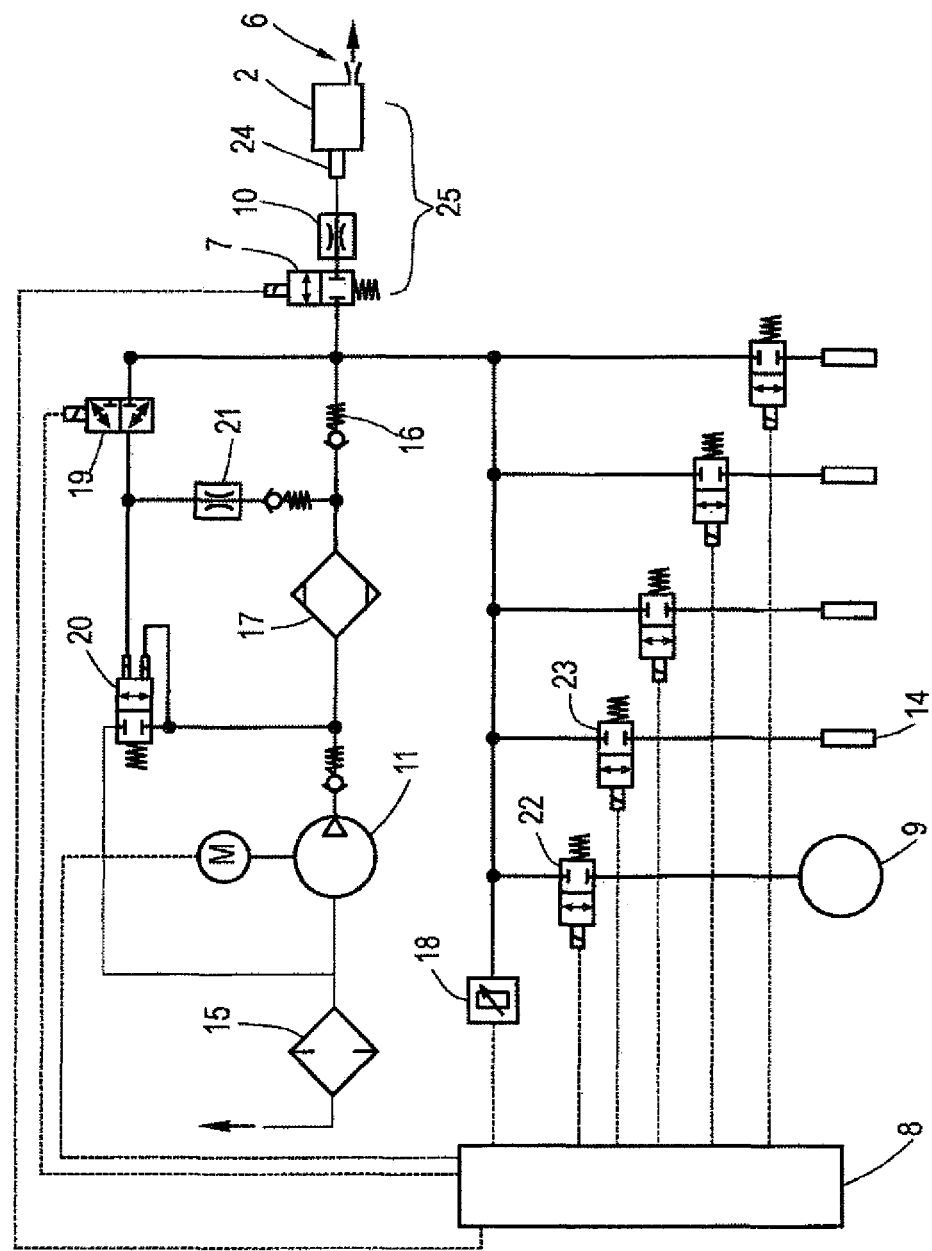

FIG. 2 shows a pneumatic diagram of an air suspension system, which has been expanded by a battery cooling system. Ambient air is here supplied to a compressor 11 via an additional noise damper 15 and compressed. The air is forced into the high pressure part of the pneumatic system via a check valve 16, where the air then first passes through an air dryer 17.

The pressure is continuously monitored by a pressure sensor 18, which transmits the instantaneous pressure to the control device 8. If an excessive pressure is detected, the control device 8 can open an electric discharge valve 19 and relieve the pressure from the system. The pressure is relieved via a discharge throttle 21. In addition, a pneumatic discharge valve is provided which mechanically causes air to be discharged when a certain pressure is exceeded. If the pressure in the system is lower than required, the control device can activate the compressor 11 to increase the pressure in the system. A pressure accumulator 9 is provided for storing compressed air, where the compressed air is stored and cooled, and supplied as required to the air springs 14 or the battery module 2.

If compressed air is to be stored in the pressure accumulator 9, the compressor 11 is activated by the control device 8, producing compressed air in the system, thereby increasing the pressure. When the pressure is now higher than the pressure in the pressure accumulator 9, the valve 22 for the pressure accumulator 9 can be opened, allowing air to flow into the pressure accumulator. Conversely, when the pressure in the pneumatic system is less than the pressure in the pressure accumulator, the valve 22 can be opened to allow compressed air from the accumulator to enter the system, thus to increasing the pressure. Following the same principle, compressed air can be transported through valves 23 into the air springs 14 or from the air springs 14.

The system can now be expanded with very few components to also cool a battery module 2. The region 25 of the battery cooling system is marked in the drawing. When the valve 7 is opened by the control device 8, air flows from the high pressure part of the system through the throttle 10, where it is expanded. This causes strong cooling of the gas, as described above. The cold gas then flows into the battery module 2 through the air inlet 24. A guide for the gas is provided in the battery module 2 so that air flow is particularly strong at the predominantly hot spots around the battery module. These predominantly hot spots are above all contacts. The air is then discharged into the environment at the air outlet.

The invention claimed is:

1. A motor vehicle comprising:
   at least one battery module configured to be cooled by compressed gas supplied at a volume flow rate of one liter per second,
   a cooling system comprising a pressure accumulator for the compressed gas to be supplied to the battery module,
   at least one sensor configured to measure a current output from the battery module,
   a control device configured to control supply of cooling gas from the pressure accumulator to the battery module in dependency of at least one output value from the at least one sensor commensurate with the measured current output, and
   a passive cooling element arranged on a supply line of the compressed gas to the pressure accumulator and on the pressure accumulator.

2. The motor vehicle according to claim 1, further comprising a pressure-relief element arranged between the pressure accumulator and the battery module.

3. The motor vehicle according to claim 2, wherein the pressure-relief element is a throttle.

4. The motor vehicle of claim 1, wherein the compressed gas is air.

5. The motor vehicle of claim 1, wherein the pressure accumulator is a component of a vehicle-mounted air spring system or a brake system.

6. The motor vehicle of claim 1, wherein the passive cooling element comprises cooling fins.

7. The motor vehicle of claim 1, further comprising at least one air supply device configured to supply air from a surroundings of the motor vehicle to the battery module.

8. The motor vehicle of claim 1, wherein the motor vehicle is a hybrid vehicle that includes both an internal combustion engine and an electric motor.

9. The motor vehicle of claim 1, wherein the at least one sensor is configured to directly measure the current output from the battery module.

* * * * *